US009092412B2

(12) United States Patent
Salch et al.

(10) Patent No.: US 9,092,412 B2
(45) Date of Patent: Jul. 28, 2015

(54) SPREADSHEET BASED DATA STORE INTERFACE

(71) Applicant: CIRRO, INC., San Juan Capistrano, CA (US)

(72) Inventors: David Herbert Salch, White City, OR (US); Brian Christopher Jew, Laguna Hills, CA (US); Mark Robert Theissen, Orange, CA (US)

(73) Assignee: CIRRO, INC., Aliso Viejo, CA (US)

( * ) Notice: Subject to any disclaimer, the term of this patent is extended or adjusted under 35 U.S.C. 154(b) by 112 days.

(21) Appl. No.: 13/631,502

(22) Filed: Sep. 28, 2012

(65) Prior Publication Data

US 2013/0086064 A1   Apr. 4, 2013

Related U.S. Application Data

(60) Provisional application No. 61/542,033, filed on Sep. 30, 2011.

(51) Int. Cl.
*G06F 7/00* (2006.01)
*G06F 17/24* (2006.01)
*G06F 17/30* (2006.01)

(52) U.S. Cl.
CPC ........ *G06F 17/246* (2013.01); *G06F 17/30427* (2013.01)

(58) Field of Classification Search
CPC .................................................. G06F 17/246
USPC ....................................................... 707/760
See application file for complete search history.

(56) References Cited

U.S. PATENT DOCUMENTS

| 8,321,847 | B1 * | 11/2012 | Garvin et al. | 717/143 |
|---|---|---|---|---|
| 2002/0129054 | A1 | 9/2002 | Ferguson et al. | |
| 2006/0010367 | A1 * | 1/2006 | Sattler et al. | 715/503 |
| 2006/0053383 | A1 | 3/2006 | Gauthier et al. | |
| 2006/0069696 | A1 | 3/2006 | Becker et al. | |
| 2010/0169758 | A1 | 7/2010 | Thomsen | |
| 2010/0306281 | A1 * | 12/2010 | Williamson | 707/803 |

\* cited by examiner

*Primary Examiner* — Ajith Jacob
(74) *Attorney, Agent, or Firm* — McDermott Will & Emery LLP

(57) ABSTRACT

A computer-implemented method for exploring external data sources includes selecting a first function from a function library in a spreadsheet application based on a first user input, designating a first data source for the first function based on a second user input, wherein the first data source comprises a first dataset stored externally to the spreadsheet application, and arranging a first cell formula comprising the first function and a first identifier for the first data source in a first cell of a spreadsheet. The method further includes selecting an output function from the function library based on a third user input, designating a source function's reference based on a fourth user input, designating an output location in the spreadsheet based on a firth user input, and arranging a second cell formula including the selected output function, the designated source function's reference and the designated output location in a second cell of the spreadsheet. The method further includes translating the first cell formula contained in the first cell referenced as the source function to the output function into a data query for a data engine in response to a refresh action and sending the data query to the data engine, wherein the data engine is configured to execute the data query against the first dataset.

19 Claims, 5 Drawing Sheets

| FILE | HOME | INSERT | LAYOUT | FORMULA | DATA | SPREADSHEET | | | | |
|---|---|---|---|---|---|---|---|---|---|---|
| Data A | | Data B | | Data C | | | | | | |
| GET EXTERNAL DATA | | | | REFRESH | | CONNECTIONS | | SORT & FILTER | | DATA TOOLS |

| | B7 | | fx | =Match(B6,"text","DS1.db1.s1.States","name") | | | | |
|---|---|---|---|---|---|---|---|---|
| | A | B | C | D | E | F | G | H | I |
| 1 | Parse("/user/sample","text,created_at") | | | | | | | | |
| 2 | ToLower(Parse("/user/sample","text,created_at"),"text") | | | | | | | | |
| 3 | WordSeparate(ToLower(Parse("/user/sample","text,created_at"),"text"),"text") | | | | | | | | |
| 4 | Remove_Punctuation(WordSeparate(ToLower(Parse("/user/sample","text,created_at"),"text"),"text") | | | | | | | | |
| 5 | RoundHour(Exclude(WordSeparate(ToLower(Parse("/user/sample","text,created_at"),"text"),"text"),"created_at") | | | | | | | | |
| 6 | CountBy(RoundHour(Exclude(WordSeparate(ToLower(Parse("/user/sample","text,created_at"),"text,created_at"),"text"),"created_at"),"text") | | | | | | | | |
| 7 | Match(CountBy(RoundHour(Exclude(WordSeparate(ToLower(Parse("/user/sample","text,created_at"),"text,created_at"),"text"),"created_at"),"text"),"DS1.db1.s1.States","name") | | | | | | | | |
| 8 | Cirro_to_Sheet(B7,B9) | | | | | | | | |
| 9 | | Text | Created_at | Count | Name | | | | |
| 10 | | California | Tue Jul 19 16:00:00 2011 | 13 | California | | | | |
| 11 | | California | Tue Jul 19 17:00:00 2011 | 18 | California | | | | |
| 12 | | Arizona | Tue Jul 19 18:00:00 2011 | 42 | Arizona | | | | |

| SHEET 1 | SHEET 2 | SHEET 3 |
|---|---|---|

Figure 4

SPREADSHEET BASED DATA STORE INTERFACE

CROSS-REFERENCE TO RELATED APPLICATIONS

This application claims the benefit of U.S. Provisional Patent Application No. 61/542,033, entitled "Spreadsheet Based Data Store Interface" and filed on Sep. 30, 2011, which is hereby incorporated by reference in its entirety for all purposes.

BACKGROUND

The subject technology relates generally to exploring data stored in data sources and, more particularly, to a system and method that allows the use of native spreadsheet functionality in a spreadsheet application to be used to explore external data sources through translation of spreadsheet formulas into standard database language (i.e. SQL) for processing on the external data sources.

Accessing large data engines today requires knowledge of the functionality and language of the particular data engines. There are many types of data engines, with new ones being released constantly. Each type of data engine has either slight differences in implementation and extensions to standards, or wholly new approaches such as the recent arrival of map-reduce based data stores. This presents two problems for end users. First, the end users must have specific knowledge and skill concerning the data engine in use which requires a learning curve or prior training. Second, most organizations have many different data engines storing collections of available data. This use of different data engines across an organization requires the end user to have specific knowledge of each data engine plus the comparisons of functionality across them to enable cross engine usage.

SUMMARY

In one aspect, the subject technology includes a computer-implemented method for exploring external data sources. The method includes selecting a first function from a function library in a spreadsheet application based on a first user input, designating a first data source for the first function based on a second user input, wherein the first data source comprises a first dataset stored externally to the spreadsheet application, and arranging a first cell formula comprising the first function and a first identifier for the first data source in a first cell of a spreadsheet. The method further includes selecting an output function from the function library based on a third user input, designating a source function's reference based on a fourth user input, wherein the source function's reference indicates the first cell of the spreadsheet, designating an output location in a spreadsheet of the spreadsheet application based on a fifth user input, and arranging a second cell formula comprising the selected output function, the designated source function's reference, and the designated output location in a second cell of the spreadsheet. The method further includes translating the first cell formula from the first cell indicated as the source function to the output function into a data query for a data engine in response to a refresh action, and sending the data query to the data engine, wherein the data engine is configured to execute the data query against the first dataset.

In another aspect, the subject technology includes a spreadsheet based data store interface system that includes a processor and a memory storing executable instructions. The executable instructions include an activation module configured to load a function set associated with a data engine into a function library of a spreadsheet application and a refresh module configured to search a spreadsheet in the spreadsheet application for an output function from from the loaded function set in response to a refresh action. The executable instructions further include a translation module configured to translate a cell formula referenced by the output function into a data query for the data engine and an execution module configured to send the data query to the data engine for execution against a first dataset identified in the cell formula and stored externally to the spreadsheet application.

It is understood that other configurations of the subject technology will become readily apparent from the following detailed description, where various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The features of the subject technology are set forth in the appended claims. However, for purpose of explanation, several configurations of the subject technology are set forth in the following figures.

FIG. 4 shows an example list of functions according to one aspect of the subject technology.

DETAILED DESCRIPTION

Figure 1:
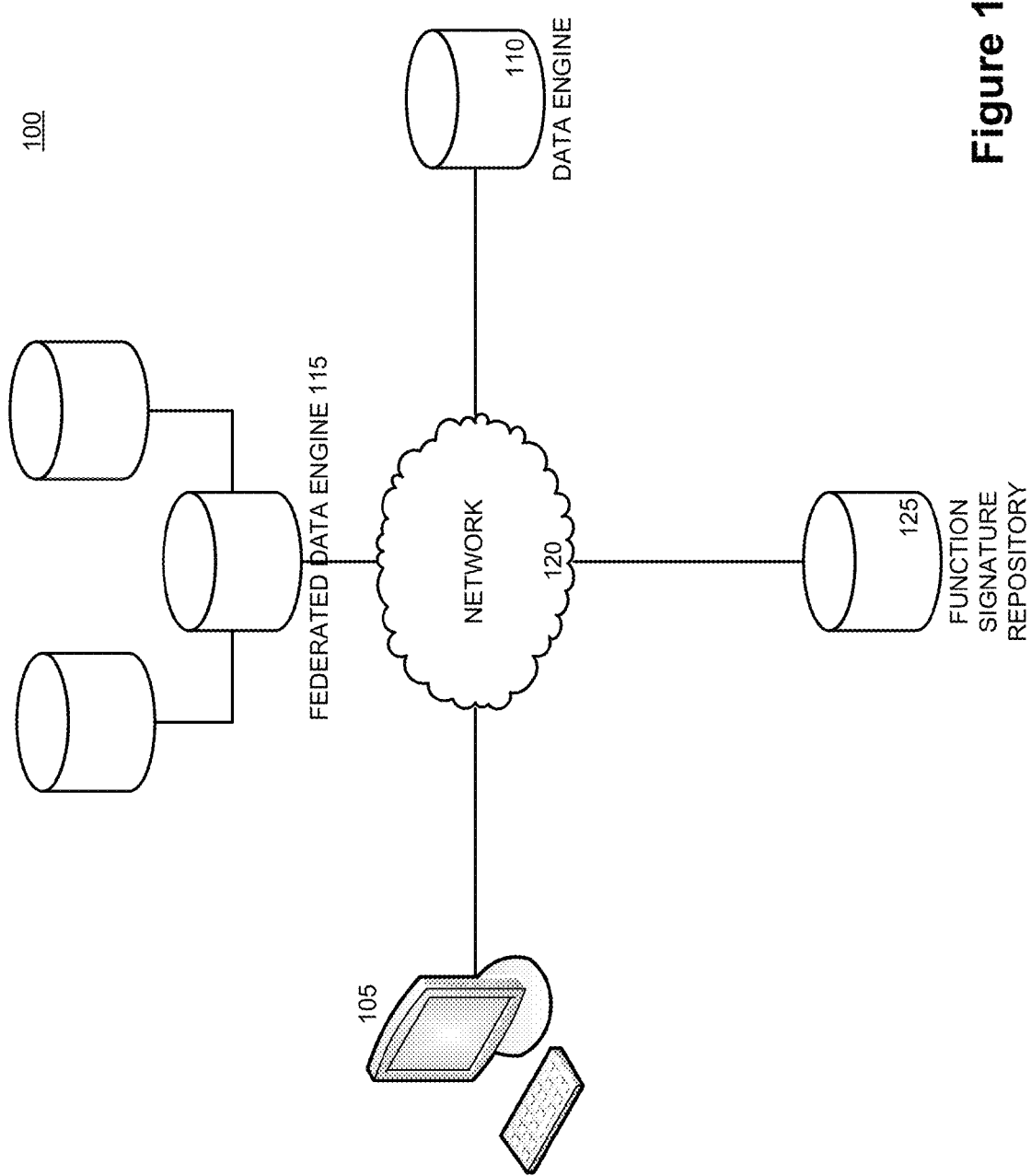
FIG. 1 illustrates a computing environment in which the subject technology may be implemented and utilized according to one aspect of the subject technology.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced without these specific details. In some instances, structures and components are shown in block diagram form in order to avoid obscuring the concepts of the subject technology.

One common skill in today's business world is spreadsheet usage. Most organizations use spreadsheets in day-to-day business activities. Although spreadsheets today have the ability to import data from a SQL based data store, this functionality is very limited. Either the user must know SQL to write a SQL query for the import or some proprietary tool with its own learning curve is required to create the SQL for the import. Neither of these solutions truly solves the problem of allowing a person with only spreadsheet skills to explore data.

The subject technology provides a method and system that fills the aforementioned deficiencies by providing translation and transformation between spreadsheet functions and data engine syntax and functionality. The subject technology may be implemented as a plug-in or add-in to a spreadsheet application, such as Microsoft Excel®. However, the subject technology is not specific to this spreadsheet application and may be implemented into other spreadsheet applications that have mechanisms to allow plug-ins or add-ins.

As a layer between the spreadsheet and the data store itself, the spreadsheet add-in provides a way to bring data exploration directly into the spreadsheet itself, where instead of SQL, actual spreadsheet functions define the data exploration. In this way, a person with only spreadsheet skills can explore and retrieve value from data stores of many types without requiring knowledge of the different data stores or engines themselves. The subject technology may be implemented to interface with SQL based data stores as well as map-reduce data stores such as those implemented within Hadoop. Other data stores and other types of data stores may be added or replaced while following the same procedures as described herein.

One objective of the subject technology is to provide a way to explore data from a remote data store without knowledge of the language used to access that data store directly. Another objective of the subject technology is to provide a way to use native spreadsheet functions to iteratively explore remote data of any size. Another objective of the subject technology is to provide a way to use data within spreadsheet cells as parameters and values inside of a query to remote data stores by simply referencing those cells within the spreadsheet. Another objective of the subject technology is to provide a way to extend the add-in spreadsheet capability and functionality as needed. Another objective of the subject technology is to generate SQL queries with extensions for non-SQL languages automatically from spreadsheet formulas describing desired functionality. Another objective of the subject technology is to provide within a common library, low level functions using non-SQL languages map-reduce to emulate SQL based functionality. Another objective of the subject technology is to provide a way to explore data sources among remote data stores of various types from within the spreadsheet through a browsing tool.

FIG. 1 illustrates an example computing environment in which the subject technology may be implemented and utilized. As illustrated in FIG. 1, computing environment 100 includes computing system 105, data engine 110, federated data engine 115, network 120, and function signature repository 125. While only one instance of each computing system 105, data engine 110, federated data engine 115, network 120, and function signature repository 125 is illustrated in FIG. 1, computing environment 100 may include more than one of each of these elements in arrangements varying from the arrangement shown in the figure.

Computing system 105 represents any type of computing device configured to communicate with other systems over a network, such as network 120, and configured to execute a spreadsheet application. Examples of such computing devices include desktop computers, laptop computers, tablets, smartphones, etc. Computing system 105 allows a user to launch a spreadsheet application stored and/or executed on computing system 105 to explore external data sources such as data engine 110 and federated data engine 115 within a spreadsheet user environment.

Data engine 110 represents a data system or data store containing data that may be accessed using the subject technology by a user operating computing system 105. The data stored within data engine 110 may include data stored according to a relational database management system, data from an online social networking service, data stored across a distributed system (e.g., NoSQL, Hadoop), metadata, etc. The subject technology is not limited to these types of data and may involve other types of data beyond those listed here. Data engine 110 may be either a structured data engine, such as in a SQL data store, or an unstructured data engine, such as a Hadoop data store using map-reduce.

Federated data engine 115 represents a federation of data systems or data stores containing data that may be accessed using the subject technology by a user operating computing system 105. Similar to data engine 110, data stored within federated data engine 115 may include data stored according to a relational database management system, data from an online social networking service, data stored across a distributed system (e.g., NoSQL, Hadoop), metadata, etc. Similarly, each of the data engines that make up federated data engine 115 may be either a structured data engine or an unstructured data engine. While FIG. 1 shows federated data engine 115 comprising three data engines, the subject technology is not limited to this number. The operation of a federated data engine, or federated query engine, is described in the patent application entitled "Federated Query Engine for Federation of Data Queries Across Structure and Unstructured Date," which is being filed concurrently herewith and is hereby incorporated by reference herein.

As shown in FIG. 1, computing system 105, data engine 110, and federated data engine 115 are interconnected via network 120. Computing system 105 is configured to transmit and receive data over one or more data connections via network 120 to and from date engine 110 and/or federated date engine 115. Network 120 may include, but is not limited to, a local network, a remote network, an interconnected network of networks (e.g., the Internet), etc.

Function signature repository 125 represents a data store containing signatures for functions available for exploring data stored in data engine 110 and/or federated data engine 115. As described below, functions signatures are downloaded from function signature repository 125 by computing system 105 to add functions to a function library of a spreadsheet application being run on computing system 105. The function signatures may be organized and downloaded to computing system 105 for data engines having data stores to which a user of computing system 105 is authorized to access.

Figure 2:
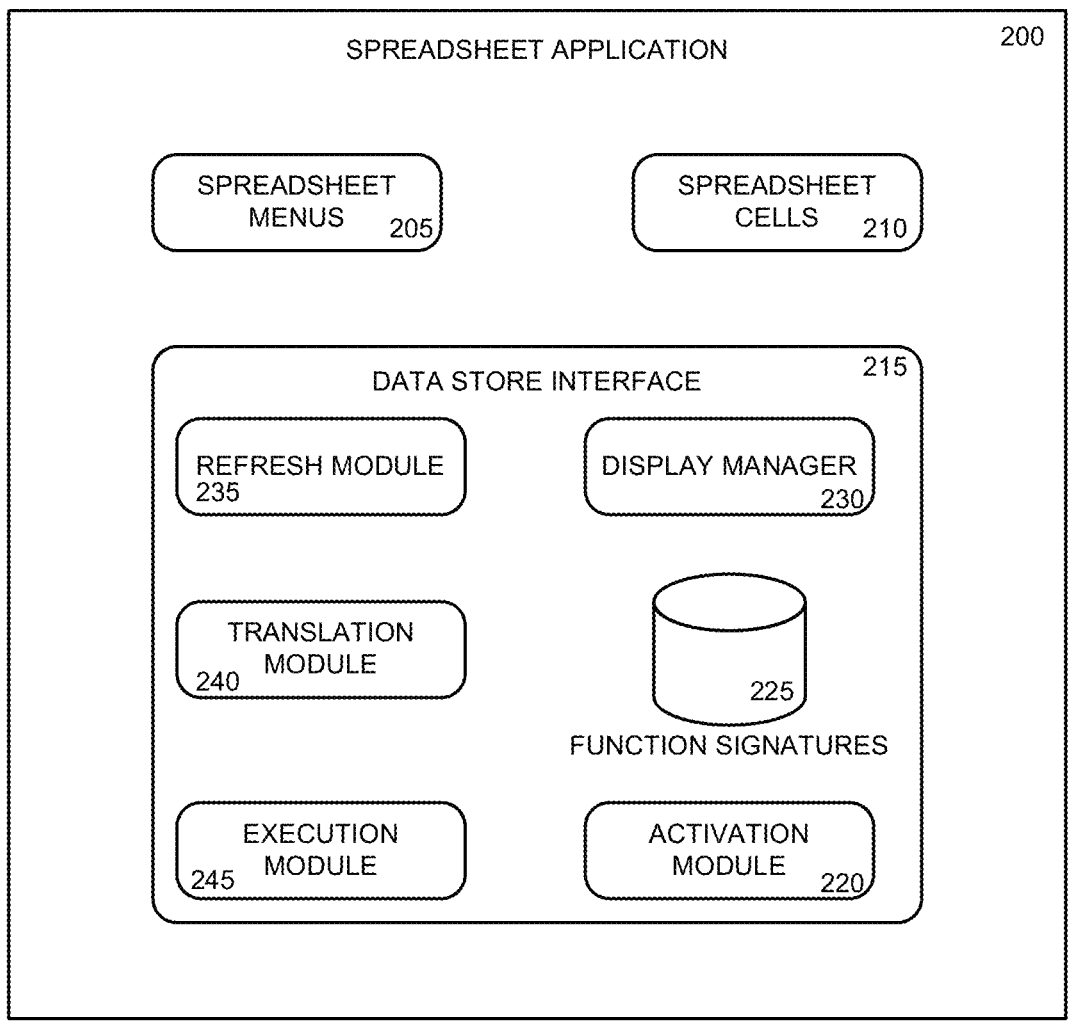
FIG. 2 illustrates components of a data store interface that is installed as a spreadsheet add-in according to one aspect of the subject technology.

FIG. 2 illustrates components of a data store interface that is installed as a spreadsheet add-in according to one aspect of the subject technology. As shown in FIG. 2, data store interface 215 is incorporated into spreadsheet application 200, which includes various spreadsheet menus 205 for manipulating and analyzing data stored in spreadsheet cells 210. Data store interface 215 includes activation module 220, function signatures 225, display manager 230, refresh module 235, translation module 240, and execution module 245. The operation of each of these modules is described in further detail below.

Spreadsheet application 200 represents a spreadsheet application configured to generate spreadsheets, each spreadsheet including an array of cells 210. Spreadsheet application 200 may be stored and executed on computing system 105. Alternatively, spreadsheet application 200 may be stored and executed on a server separate from computing system 105, but accessible to a user of computing system 105 via a client application, such as a web browser or virtual interface application.

FIG. 2 shows data store interface 215 being contained with spreadsheet application 200. Alternatively, data store interface 215 may be stored in memory on computing system 105 external to spreadsheet application 200 but configured to interface with spreadsheet application 200 to implement the functionality described herein.

Activation module 220 represents instructions and data configured to execute an activation process for configuring spreadsheet application 200 to allow a user to explore external data sources, such as data engine 110 and federated data engine 115. During the activation process, activation module 220 downloads function signatures 225 from function signature repository 125. Function signatures 225 downloaded from function signature repository 125 may be limited to functions compatible with data engines and data stores to which the user is authorized access. For example, activation module 220 may present user credentials of the current user to function signature repository 125, which in turn returns only function signatures 225 for data engines and data stores associated with the user credentials.

According to one aspect of the subject technology, each spreadsheet in spreadsheet application 200 is activated independently. Once a spreadsheet is activated, it can be shared with another installation of spreadsheet application 200 on a different computing system which can then connect to the external data sources and refresh the data values in the spreadsheet, subject to the user of the different user system having proper credential to connect to the same external data sources. Alternatively, activation performed by activation module 220 may be tied to a particular installation of spreadsheet application 200 so that even if a spreadsheet is activated on one installation, it must also be activated on another spreadsheet after it is shared. This arrangement may be used to provide additional layers of functionality and security.

Activation module 220 may be launched through many means. For example, activation module 220 may be launched to perform the activation process through user input with a control element such as a button injected into a data source ribbon of spreadsheet application 200. Once activation module 220 has completed the activation process, the activate button may be changed to a refresh button to launch refresh module 235.

The function signatures downloaded from function signature repository 125 may be for locally produced custom functions or pre-distributed functions. Locally produced custom functions can import functionality from existing data systems such as map-reduce or SQL, which have minor changes applied to make them compatible with the expected syntax and format of data store interface 215.

The functions signature allow data store interface 215 to manage the display and translation of the functions when used within a spreadsheet generated by spreadsheet application 200. One important aspect of this is the display of the function text, properly formatted, within the cells themselves. The function signatures provide the necessary formatting data to accomplish this. This formatting data is used by display manager 230. Display manager 230 represents instructions and data configured to display a simplified logical representation of a function within a cell while retaining additional parameters internally such as output location cell, etc. This abstraction provides a way to display functions in a human readable form while keeping all necessary data to provide for translation of the function when it is time to execute the function.

Activation module 220 also may be configured to load into data store interface 215 available help mechanisms for the functions associated with the downloaded function signatures. Help text may be formatted and provided to allow the functions associated with the downloaded function signatures to appear identical to the existing internal functions of the spreadsheet and inserted in such a way as to emulate native functions.

The end result of activation is that the new database functions appear within the spreadsheet alongside and equal to existing internal functions of the function library of spreadsheet application 200. Other than organization on the lists of functions, there is no effective difference apparent to the end user between newly added functions and native built-in functions.

After activation, the user may build the spreadsheet using available wizards and other capabilities built into spreadsheet application 200. Cells can be referenced as inputs to other cells, effectively chaining a very long formula together in an iterative fashion. This referencing is normally part of the spreadsheet internal functionality and only needs to be managed by display manager 230 to produce proper and easily readable formulas within the cells.

As the user builds the spreadsheet, the user may only consider what logical operations are desired on the data, not the details of how the operations should execute in a syntactically correct manner for the data engine available. This is an innovative departure from previous query languages. The functions themselves do not necessarily reference a specific data execution engine or manner of execution. Translation module 235 represents instructions and data configured to manage the translation of the logical function into the physical operation, language and destination that is required. The end user can now concentrate on what should be done instead of how it should take place.

While building the spreadsheet the user is free to reference a populated cell within the spreadsheet as a data source of a function. When referencing a cell as the data source for a function, a formula for the current cell is built to include the formula of the referenced cell. In this way formulas representing complex data operations can be chained together across multiple cells. The final formula appears within the last cell populated, and it contains the formulas or functions from all previous cells referenced. On the spreadsheet view, the formula may appear in its entirety while selecting a single cell may show only the formula added in that cell. This is handled by display manager 230.

When the user needs to reference source data from an external data source for the input to a function, the data location may be input directly or a clickable button may be provided in spreadsheet application 200 to allow exploration of external data sources from within the wizard. It is common for wizards within spreadsheets to have such a button for exploring local data sources. The add-in would change the function of that button to be able to use a common explorer tool to explore external data sources as well as local data sources. The external data sources identified for exploration may include all external data sources that computing system 105 is aware of or may be limited to only those external data sources to which the user is authorized access.

Refresh module 235 represents instructions and data configured to identify cell formulas for translation into data queries to be sent to external data sources. When the user desires to see actual data values as a result of the function run on actual data, refresh module 235 launches the translation of queries from spreadsheet functions to database queries by translation module 240. The refresh action could be launched by several means, such as a refresh button within the ribbon of spreadsheet application 200.

When refresh is launched, refresh module 235 searches through populated cells within the spreadsheet that is open. Refresh module 235 looks for registered functions or output functions in the populated cells of the spreadsheet. The registered functions or output functions include references to cells in the spreadsheet containing functions associated with accessing and analyzing external data sources that are represented by function signatures 225. The registered functions or output functions can be identified by any means, such as by a naming convention, to distinguish the functions from the native, built-in functions of spreadsheet application 200. For each discovered cell that contains a registered function or output function, refresh module 235 looks for a source function's reference indicating the cell location of the function to be translated and a designated output location. When a registered function or output function is found, translation module 240 begins translation for that cell.

Translation module 240 represents instructions and data configured to evaluate the cell formula in the discovered cell, and break it down into executable functions in logical order. Then each function is translated into applicable SQL or map-reduce functionality depending on the external data source designated for the function in the cell formula. This is done according to commonly known practices within the industry. The resulting data query is compatible with the data engine or system that holds the data.

Execution module 245 represents instructions and data configured to facilitate the execution of the translated data query. After translation into a data query, the data query is handed to execution module 245 which submits to the designated data source, such as data engine 110 or federated data engine 115, the data query through a common interface such as Open Database Connectivity (ODBC) or Java Database Connectivity (JDBC), other known interfaces. The execution may be performed on one or more destination data systems, such as data engine 110 and/or federated data engine 115. The data query may be directed by execution module 245 to a single destination which can receive both SQL and map-reduce functions calls. In other examples, execution module 245 may differentiate between multiple destinations by type or object name and make appropriate connections.

This translation process is repeated by translation module 240 for all cells that contain registered functions or output functions. Other functions without data output locations are skipped over. Since multiple cells maybe found that have registered functions with designated output locations, multiple queries may be launched simultaneously, one query per cell.

When each query returns, execution module 245 populates the data values into the cells specified by the output location. If the original cell specified a single cell or single row of cells for the output location, then the entire return data set will be placed into the spreadsheet cells starting at that location. If the original cell specified a range of rows as the output location, the return data set is limited to what will fit within that range of rows and the rest the return data cancelled or ignored. In this way the end user can control whether a full data return is desired or a sample data return.

The functions downloaded into spreadsheet application 200 are intended to be limited to very basic functionality but may include more advanced functions. The goal is to provide enough small elements of functionality so that they can be used together in a formula to create a wide variety of high level functionality. This matches the level of functions natively in the spreadsheet which perform low operations per each function. The list of functions may be extended to contain high level specific functionality for desired cases as needs arise.

Each function is designed to allow input to be either from an external data source or from another cell within the spreadsheet. When another cell is referenced as the data source, it is the results of that cell's data return that is used as input. This allows formulas to be built iteratively with each cell taking processed data input from the cell referenced as input. This also allows all of the normal spreadsheet referencing functionality to apply within data formulas.

The subject technology utilizes a library of these functions created on data engines such as map-reduce or as user-defined functions within SQL. Having the preexisting libraries of functions available allows consistent references of those functions and common syntax. The actual function code to perform the functionality on the data exists within the data engines themselves, either SQL, map-reduce, or other types. It is only the signature of the function and associated metadata that are downloaded into data store interface 215.

Another important benefit of the function library is that the functionality described within the logical function can be executed on any physical machine. For instance a to_lower function could perform the lowercase conversion on a map-reduce file, or a SQL table, or any other data source, provided that the physical function exists on the actual data system. There can be multiple physical translations of a single logical function within the add-in, and thereby allow that function to automatically execute on whichever system is appropriate.

A federation system, such as federated data engine 115, or virtualization system could be utilized to manage this generic logical to physical translation. The SQL language coming from the add-in can be presented to an engine that would distribute the physical operations of the functions accordingly. This invention allows for a single logical function to represent a single logical action on a data element, without regard to the physical execution of that function, assuming an execution layer that can distribute those functions properly.

Figure 3:
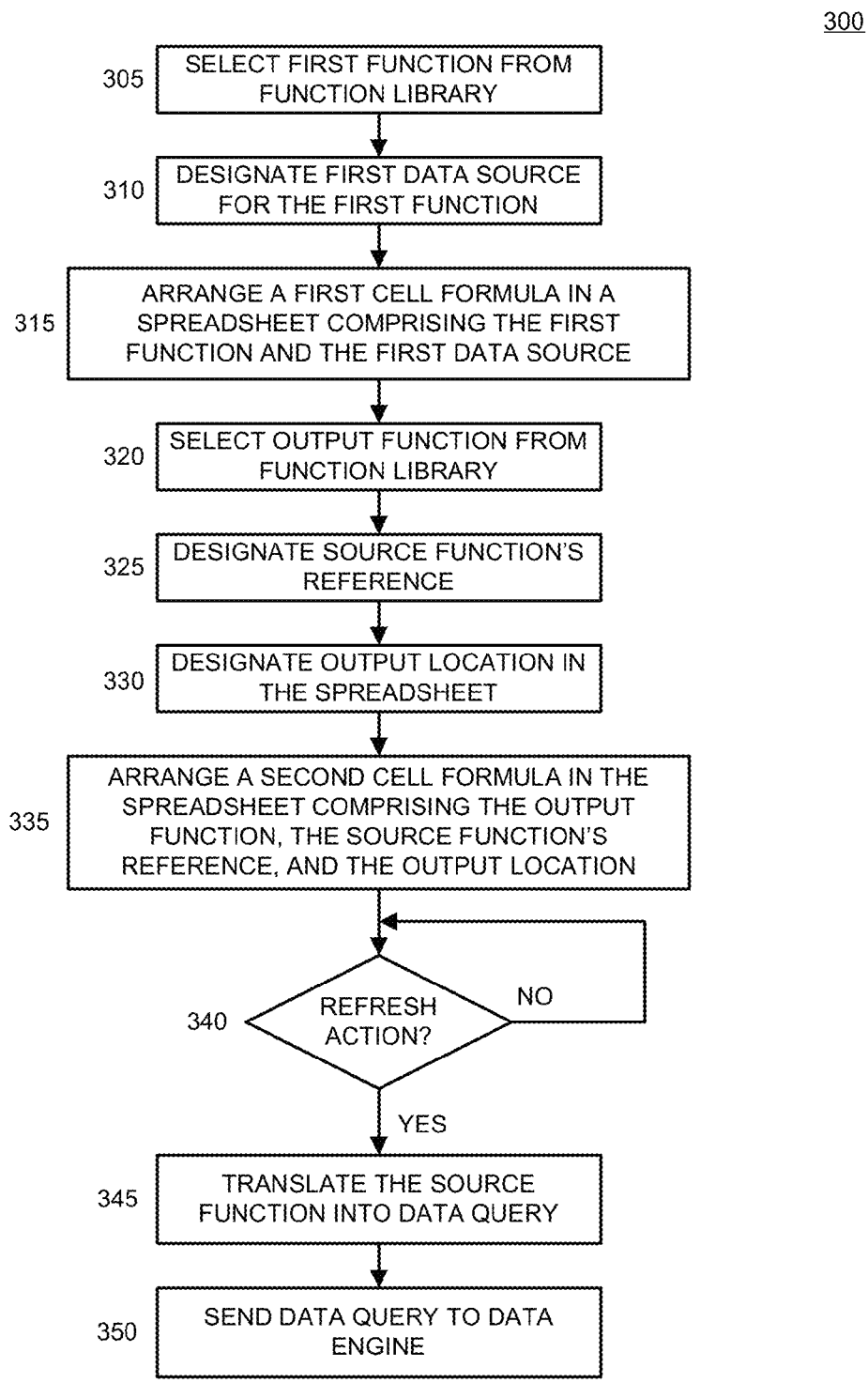
FIG. 3 is a flowchart illustrating a process for exploring external data sources through a data store interface in a spreadsheet application according to one aspect of the subject technology.

FIG. 3 is a flowchart illustrating a process for exploring external data sources through a data store interface in a spreadsheet application according to aspects of the subject technology. As shown in FIG. 3, process 300 includes selecting a first function from a function library (305), designating a first data source for the first function (310), and arranging a first cell formula in a spreadsheet including the selected first function and the designated first data source (315). Process 300 further includes selecting an output function from the function library (320), designating a source function's reference for the selected output function (325), designating an output location in the spreadsheet for the selected output function (330), and arranging a second cell formula in the spreadsheet including the selected output function, the designated source function's reference, and the designated output location (335). In response to a refresh action (340), the process translates the source function referenced in the second cell formula into a data query (345) and sends the data query to a data engine for execution (350). Process 300 is described in further detail below.

Process 300 may be initiated by a user at computing system 105 after the activation process has been completed within spreadsheet application 200. A first function is selected from a function library in spreadsheet application 200 based on a first user input from the user (305). After the activation process, the function library of spreadsheet application 200 includes functions associated with function signatures 225 installed in spreadsheet application 200 in addition to the native functions built in to spreadsheet application 200. The user input may involve the user selecting the first function from a menu or list displayed within spreadsheet application 200 either independently or using a wizard tool.

After the first function has been selected, a first data source for the first function is designated based on a second user input from the user (310). In one example, the first data source includes a first dataset stored externally to spreadsheet application 200. For example, the first dataset may be stored in a data store in either data engine 110 or federated data engine 115. The user may select the first data source from a list of data sources displayed within spreadsheet application 200 to which the user is authorized to access. Alternatively, the user may explore available data sources using an exploration tool within spreadsheet application 200 and designate the first data source from the exploration tool.

A first cell formula is constructed and arranged in a first cell of the spreadsheet (315). The first cell formula includes the first function and a first identifier for the first data source. The first cell formula may be arranged in the first cell of the spreadsheet in a manner similar to standard spreadsheet formulas entered by a user through a formula bar in the spreadsheet or using a wizard.

In addition to the first data source, the user may designated a second data source for the first function, which will add a second identifier for the second data source to the cell formula. The second data source may be another external data source, such as data engine 110 or federated data engine 115, selected in a manner similar to that described above. Alternatively, the second data source may be one or more cells in the spreadsheet. The cells in the spreadsheet may contain data, which if designated by the user as the second data source would result in the first function being executed on both data within the spreadsheet and the first data set in the first data source.

Besides data, another cell in the spreadsheet designated as the second data source may contain another cell formula that includes a second function selected from the function library and one or more other data sources for the second function. The second function may be one of the functions associated with functions signatures 225 or may be one of the standard spreadsheet functions. Similarly, the other data sources may be external data sources or may reference other cells in the spreadsheet. With this arrangement, the user can iteratively build a cell formula containing functions for exploring external data sources by creating cell formulas using data functions associated with the external data sources and using those cell formulas as data sources for other cell formulas.

Rather than populating cells containing cell formulas including data functions associated with external data sources with the data results of the data functions, display manager 230 is configured to update the logical representations of the cell formulas to reflect any changes to the designated data sources and/or the logical representations of the cell formulas from cells designated as data sources. In this manner, the user can construct complicated data queries into one or more external data sources within a standard spreadsheet interface using logical representations of the desired data functions that may be easier to read by the user than the actual data query using a query language compatible with the external data sources.

An output function is selected from the function library in spreadsheet application 200 based on a third user input (320). In association with the output function, a source function's reference is designated based on a fourth user input (325). The source function's reference identifies the location in the spreadsheet of a function that the user wishes to be executed against the data source(s) designated for the function. For example, the first function in the first cell formula arranged in the first cell of the spreadsheet may be designated as the source function with the cell identifier of the first cell designated as the reference for the source function.

Also in associate with the output function, an output location in the spreadsheet is designated based on a fifth user input (330). The function library may include multiple output functions from which the user may select. The different output functions may be associated with different output formats inserted into the spreadsheet at the designated output location. In this regard, the selected output function formats the query results or data results into a particular format for that selected output function and arranges the formatted query results or data results in the spreadsheet. For example, the output format may present all of the data results in the spreadsheet, a specified number of data results in the spreadsheet, all of the data results in a pivot table, a specified number of data results in a pivot table, etc. The user may designate the output location using the tools and techniques commonly employed within spreadsheet applications to designated cells as the destination of a cell formula constructed within the spreadsheet. The designated output location may be a single cell in the spreadsheet, a single row/column of cells in the spreadsheet, and/or a range of rows/columns in the spreadsheet.

A second cell formula is constructed and arranged in a second cell of the spreadsheet (335). The second cell formula includes the selected output function, the designated source function's reference, and the designated output location in the spreadsheet.

When the user is ready to view data results from the selected function(s) represented in the spreadsheet, the user initiates a refresh action in the spreadsheet application (340). The refresh action may be initiated by the user selecting a menu item in the spreadsheet application or selecting a user control, like a button, displayed within the spreadsheet application. In response to the refresh action, refresh module 235 searches the populated cells of the spreadsheet, as described above, to locate the cells containing output functions. The cell formula contained within the cell referenced as a source function for the located output function is passed to translation module 240 to be translated into a data query (345), as described above. Execution module 245 then sends the data query to the data engine of the designated data source to execute the data query against the dataset stored on the data source (350). If more than one output function is located in the spreadsheet, the cell formulas of the referenced source functions for the output functions may be translated in parallel and sent to one or more data engines for execution and processing in parallel.

In addition to facilitating parallel processing of multiple data queries, execution module 245 may be configured to enforce a hierarchy of execution or dependent execution. For example, the following functions may be arranged as cell formulas in a spreadsheet: Function1(source data), Function2(Function1); Function3(Function2); and Output1(Function3, Destination1). In this example, Output1 is an output function that designates Function3 as a source function with the data/query results arranged in Destination1 upon a refresh action. Adding Function4(Part A of Destination)), Function5(Function4), and Output2(Function5,Destination2) introduces the need to enforce a hierarchy of execution to complete processing of both output functions Output1 and Output2. Specifically, Output2 must wait for the completion of Output1 before Output2 can be run. To manage dependent functions in these situations, execution module 245 may be configured to resolve all references in source functions designated for output functions to identify any functions that use designated output locations of output functions as a data source. Execution module 245 uses the identified functions to build an order of execution necessary to ensure functions are executed in an order that satisfies dependencies in the group of functions in the spreadsheet.

The example above described the use of output functions to allow the user to designate which function(s) in the spreadsheet cells is translated and sent to a data engine for execution and to specify how the data results are presented in the spreadsheet. Alternatively, the functions selected from the function library having one or more designated data sources may be configured to allow an output location in the spreadsheet to be designated as well. With this arrangement, refresh module 235 searches the populated cells of the spreadsheet for cells containing functions having designated output locations. The cell formula in a located cell would be translated into a data query and sent to a data engine for execution.

FIG. 4 shows an example of data store interface 215 being used in spreadsheet application 200 for a simple use case. In this particular example, the use case is executing a sequence of functions on a raw data file, "/user/sample." The file is parsed by a map-reduce routine into columns (cell formula arranged in cell B1), the columns are modified to be lower case (cell formula arranged in cell B2), the words are split individually (cell formula arranged in cell B3), punctuation is removed (cell formula arranged in cell B4), time entries are rounded into hours (cell formula arranged in cell B5), occurrences of individual words are counted (cell formula in cell B6), and a join to a SQL database containing keywords of interest is performed (cell formula in cell B7). An output function referencing cell B7 as a source function and cell B9 as a designated output location (cell formula in cell B8) results in a data return to an output location in the spreadsheet of the spreadsheet application showing the number of times the chosen words appear in the raw data on a per hour basis. The keyword list could be supplied from the spreadsheet itself instead of a SQL data store through use of a different function.

As shown in the spreadsheet cells depicted in FIG. 4, the final data query is iteratively constructed using selected functions and designated data sources found in cells B1 to B7. Each of these cells contains a cell formula that is made up of a function selected from a function library of the spreadsheet application, the designated data sources for that function, as well as the selected functions and designated data sources identified in other cells referenced as data sources. Comparing the cell formula displayed in the depicted formula bar in FIG. 4 to the contents of cell B7 in the spreadsheet illustrates one example of the logical representation of the cell formula generated by display manager 230.

The following description describes an example system in which aspects of the subject technology can be implemented.

Figure 5:
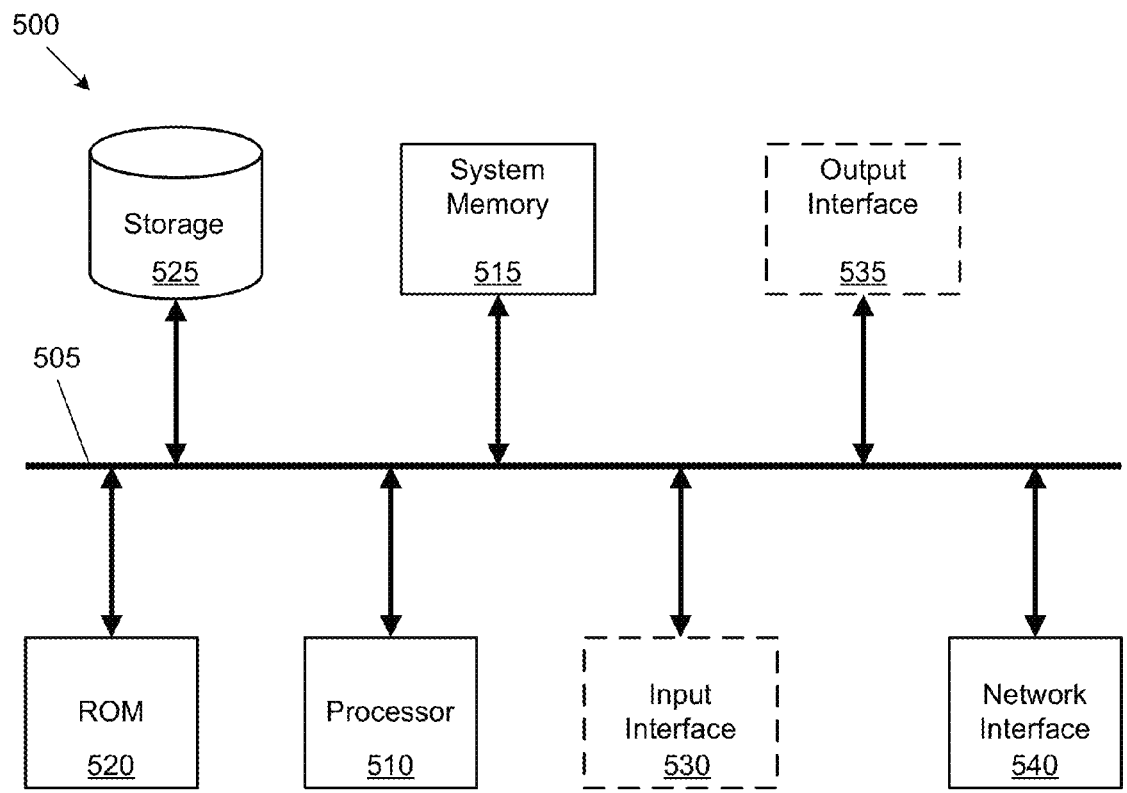
FIG. 5 is a block diagram illustrating a system in which the subject technology may be implemented according to one aspect of the subject technology.

FIG. 5 conceptually illustrates a system 500 with which some implementations of the subject technology can be implemented. The system 500 can be a computer, phone, PDA, or another sort of electronic device. Such a system includes various types of computer readable media and interfaces for various other types of computer readable media. The system 500 includes a bus 505, processing unit(s) 510, a system memory 515, a read-only memory 520, a storage device 525, an optional input interface 530, an optional output interface 535, and a network interface 540.

The bus 505 collectively represents all system, peripheral, and chipset buses that communicatively connect the numerous internal devices of the system 500. For instance, the bus 505 communicatively connects the processing unit(s) 510 with the read-only memory 520, the system memory 515, and the storage device 525.

From these various memory units, the processing unit(s) 510 retrieves instructions to execute and data to process in order to execute the processes of the subject technology. The processing unit(s) can be a single processor or a multi-core processor in different implementations.

The read-only-memory (ROM) 520 stores static data and instructions that are needed by the processing unit(s) 510 and other modules of the system 500. The storage device 525, on the other hand, is a read-and-write memory device. This device is a non-volatile memory unit that stores instructions and data even when the system 500 is off. Some implementations of the subject technology use a mass-storage device (such as a magnetic or optical disk and its corresponding disk drive) as the storage device 525.

Other implementations use a removable storage device (such as a flash drive, a floppy disk, and its corresponding disk drive) as the storage device 525. Like the storage device 525, the system memory 515 is a read-and-write memory device. However, unlike storage device 525, the system memory 515 is a volatile read-and-write memory, such a random access memory. The system memory 515 stores some of the instructions and data that the processor needs at runtime. In some implementations, the subject technology's processes are stored in the system memory 515, the storage device 525, and/or the read-only memory 520. For example, the various memory units include instructions for processing multimedia items in accordance with some implementations. From these various memory units, the processing unit(s) 510 retrieves instructions to execute and data to process in order to execute the processes of some implementations.

The bus 505 also connects to the optional input and output interfaces 530 and 535. The optional input interface 530 enables the user to communicate information and select commands to the system. The optional input interface 530 can interface with alphanumeric keyboards and pointing devices (also called "cursor control devices"). The optional output interface 535 can provide display images generated by the system 500. The optional output interface 535 can interface with printers and display devices, such as cathode ray tubes (CRT) or liquid crystal displays (LCD). Some implementations can interface with devices such as a touchscreen that functions as both input and output devices.

Finally, as shown in FIG. 5, bus 505 also couples system 500 to a network interface 540 through a network adapter (not shown). In this manner, the computer can be a part of a network of computers (such as a local area network ("LAN"), a wide area network ("WAN"), or an Intranet, or an interconnected network of networks, such as the Internet. The components of system 500 can be used in conjunction with the subject technology.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and the claims of this application, the terms "computer", "server", "processor", and "memory" all refer to electronic or other technological devices. These terms exclude people or groups of people. For the purposes of the specification, the terms display or displaying means displaying on an electronic device. As used in this specification and the claims of this application, the terms "computer readable medium" and "computer readable media" are entirely restricted to tangible, physical objects that store information in a form that is readable by a computer. These terms exclude wireless signals, wired download signals, and other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be a form of sensory feedback, e.g., visual feedback, auditory feedback, or tactile feedback; and input from the user can be received in a form, including acoustic, speech, or tactile input. In addition, a computer can interact with a user by sending documents to and receiving documents from a device that is used by the user; for example, by sending web pages to a web browser on a user's client device in response to requests received from the web browser.

Configurations of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or a combination of one or more such back end, middleware, or front end components. The components of the system can be interconnected by a form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some configurations, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that a specific order or hierarchy of steps in the processes disclosed is an illustration of example approaches. Based upon design preferences, it is understood that the specific order or hierarchy of steps in the processes can be rearranged, or that all illustrated steps be performed. Some of the steps can be performed simultaneously. For example, in certain circumstances, multitasking and parallel processing can be advantageous. Moreover, the separation of various system components in the configurations described above should not be understood as requiring such separation in all configurations, and it should be understood that the described program components and systems can generally be integrated together in a single software product or packaged into multiple software products.

The previous description is provided to enable a person skilled in the art to practice the various aspects described herein. Various modifications to these aspects will be readily apparent to those skilled in the art, and the generic principles defined herein can be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject technology.

A phrase such as an "aspect" does not imply that such aspect is essential to the subject technology or that such aspect applies to all configurations of the subject technology. A disclosure relating to an aspect can apply to all configurations, or one or more configurations. A phrase such as an aspect can refer to one or more aspects and vice versa. A phrase such as a "configuration" does not imply that such configuration is essential to the subject technology or that such configuration applies to all configurations of the subject technology. A disclosure relating to a configuration can apply to all configurations, or one or more configurations. A phrase such as a configuration can refer to one or more configurations and vice versa.

What is claimed is:

1. A computer-implemented method for exploring external data sources, the method comprising:
    selecting a first function from a function library in a spreadsheet application based on a first user input;
    designating a first data source for the first function based on a second user input, wherein the first data source comprises a first dataset stored externally to the spreadsheet application;

arranging a first cell formula comprising the first function and a first identifier for the first data source in a first cell of a spreadsheet;

selecting an output function from the function library based on a third user input;

designating a source function's reference based on a fourth user input, wherein the source function's reference indicates the first cell of the spreadsheet;

designating an output location in a spreadsheet of the spreadsheet application based on a fifth user input;

arranging a second cell formula comprising the selected output function, the designated source function's reference, and the designated output location in a second cell of the spreadsheet;

translating the first cell formula in the first cell indicated as the source function to the output function into a data query for a data engine in response to a refresh action; and sending the data query to the data engine, wherein the data engine is configured to execute the data query against the first dataset.

2. The computer-implemented method according to claim 1, further comprising:

designating a second data source for the first function based on a sixth user input, wherein the first cell formula further comprises a second identifier for the second data source.

3. The computer-implemented method according to claim 2, wherein the second data source comprises a second dataset stored externally to the spreadsheet application, and wherein the data engine is configured to execute the data query against the first dataset and the second dataset.

4. The computer-implemented method according to claim 3, wherein the first dataset is stored in a data store of a first type and the second dataset is stored in a data store of a second type, and wherein the first type of data store is different from the second type of data store.

5. The computer-implemented method according to claim 2, wherein the second data source comprises one or more cells in the spreadsheet, and wherein the data engine is configured to execute the data query against the first dataset and data contained in the one or more cells in the spreadsheet.

6. The computer-implemented method according to claim 2, further comprising:

selecting a second function from the function library based on a seventh user input;

designating a third data source for the second function based on an eighth user input; and arranging a second cell formula comprising the second function and a third identifier from the third data source in a second cell of the spreadsheet, wherein the second data source comprises the second cell formula arranged in the second cell of the spreadsheet, wherein a combination of the first cell formula and the second cell formula is translated into the data query for the data engine in response to the refresh action.

7. The computer-implemented method according to claim 6, wherein arranging the first cell formula in the first cell of the spreadsheet comprises:

presenting a logical representation of the first cell formula and the second cell formula in the first cell of the spreadsheet.

8. The computer-implemented method according to claim 1, further comprising:

receiving a function set associated with the data engine; and updating the function library in the spreadsheet application to include the received function set, wherein the function set comprises the first function and the output function.

9. The computer-implemented method according to claim 8, wherein the function set is received in response to an activation action.

10. The computer-implemented method according to claim 1, further comprising:

receiving query results from the data engine in response to sending the data query; and arranging the query results in the designated output location in the spreadsheet.

11. The computer-implemented method according to claim 1, further comprising:

registering a set of data sources in the spreadsheet application, wherein the set of data sources comprises the first data source.

12. The computer-implemented method according to claim 11, further comprising:

identifying available data sources to which a user of the spreadsheet application is authorized to access, wherein the set of data sources comprises the available data sources.

13. The computer-implemented method according to claim 1, further comprising:

searching the spreadsheet for cell formulas comprising output functions in response to the refresh action; and translating cell formulas in cells indicated by source function references of the output functions into data queries for the data engine in response to the refresh action.

14. A spreadsheet based data store interface system comprising:

a processor; and a memory storing executable instructions comprising:

an activation module configured to load a function set comprising a plurality of function signatures for functions associated with a data engine into a function library of a spreadsheet application;

a refresh module configured to search a spreadsheet in the spreadsheet application for an output function from the loaded function set in response to a refresh action, wherein the output function references a first cell formula in the spreadsheet, the first cell formula including a first function from the loaded function set and a reference to second cell formula in the spreadsheet, the second cell formula including a second function from the loaded function set;

a translation module configured to translate the first cell formula referenced by the output function and the second cell formula referenced by the first cell formula into a data query for the data engine; and an execution module configured to send the data query to the data engine for execution against a first dataset identified in the first or second cell formula and stored externally to the spreadsheet application.

15. The spreadsheet based data store interface system according to claim 14, wherein the execution module is further configured to receive query results from the data engine, format the query results, and arrange the formatted query results in an output location in the spreadsheet designated in the output function.

16. The spreadsheet based data store interface system according to claim 14, wherein the activation module is further configured to download the function set from a repository external to the spreadsheet based data store interface system.

17. The spreadsheet based data store interface system according to claim 14, wherein the memory storing executable instructions further comprises:

a display manager configured to present a logical representation of the first cell formula including the second cell formula in the spreadsheet based on the plurality of function signatures.

18. The spreadsheet based data store interface system according to claim 14, wherein the first cell formula identifies a second dataset with respect to a registered function and stored externally to the spreadsheet application, and wherein the first dataset is stored in a data store of a first type and the second dataset is stored in a data store of a second type different from the first type.

19. The spreadsheet based data store interface system according to claim 14, wherein the first cell formula designates a data source comprising one or more cells in the spreadsheet for a registered function, and wherein the data query is executed against the first data set and the designated data source.

* * * * *